Jan. 27, 1942.  H. J. DE N. McCOLLUM  2,270,955
AUTOMOBILE HEATER
Filed June 24, 1939  2 Sheets-Sheet 1
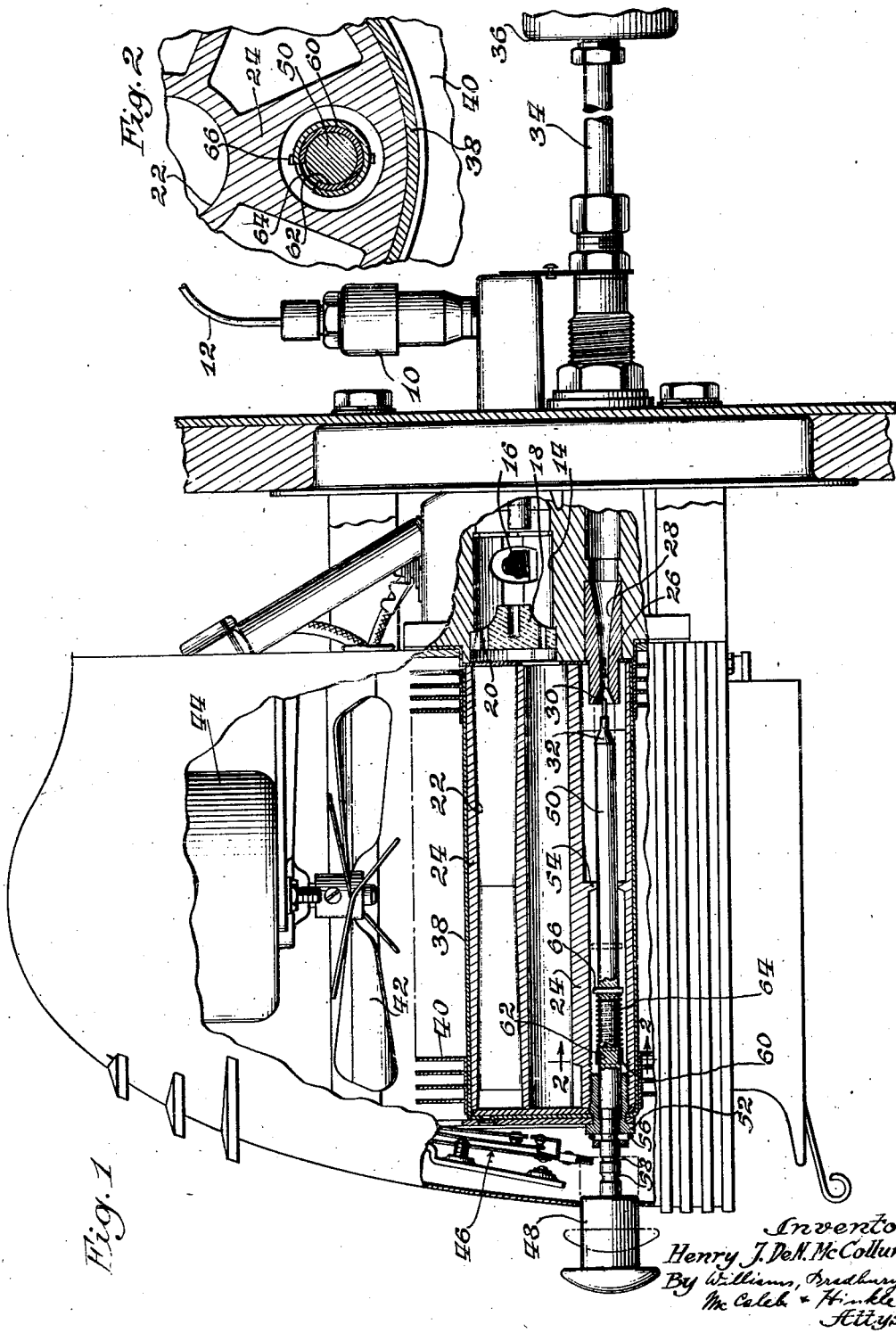
Inventor
Henry J. DeN. McCollum
By Williams, Bradbury,
McCaleb & Hinkle
Attys.

Jan. 27, 1942.　　H. J. DE N. McCOLLUM　　2,270,955
AUTOMOBILE HEATER
Filed June 24, 1939　　2 Sheets-Sheet 2
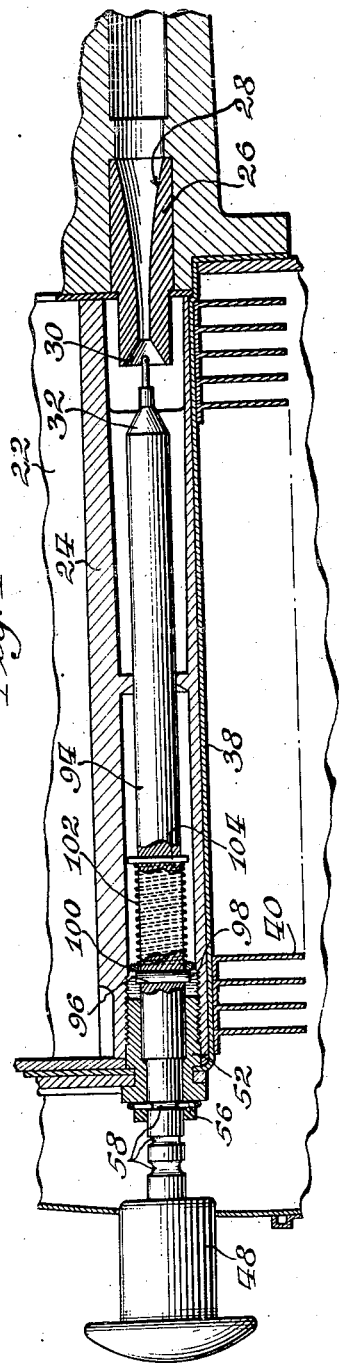
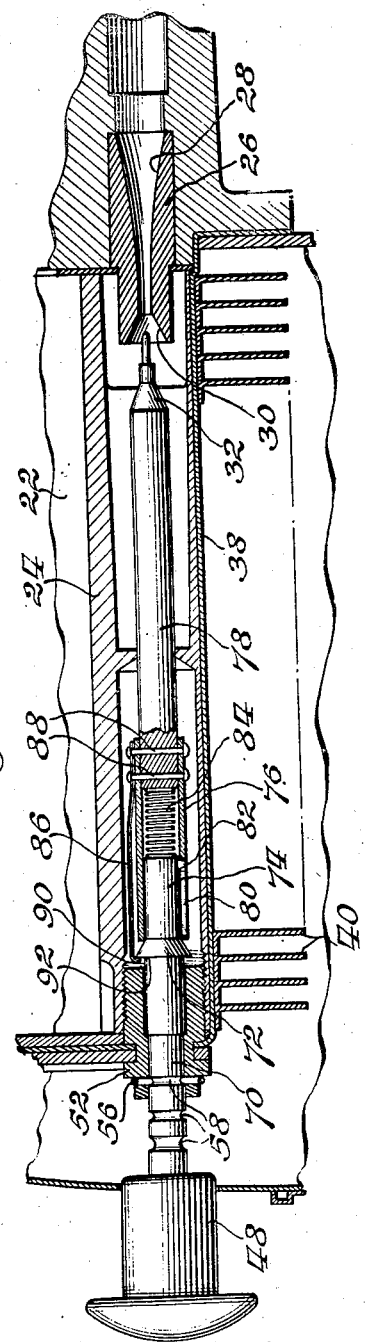
Inventor
Henry J. DeN. McCollum
By Williams, Bradbury, McCaleb & Hinkle
Attys.

Patented Jan. 27, 1942

2,270,955

UNITED STATES PATENT OFFICE 2,270,955

AUTOMOBILE HEATER

Henry J. De N. McCollum, Chicago, Ill.

Application June 24, 1939, Serial No. 281,011

18 Claims. (Cl. 126—91)

My invention relates generally to automobile heaters of the internal combustion type, and more particularly to improved safety means for preventing damage to the heater and to adjacent parts of the automobile due to overheating.

It is an object of my invention to provide an improved means for shutting off the heater whenever the temperature of the radiator element thereof becomes excessively or dangerously high.

A further object is to provide an improved shut off device for automobile heaters of the internal combustion type which will be operative to shut off the heater when the temperature thereof exceeds a predetermined maximum value, and will automatically be reconditioned for operation when the heater drops to normal operating temperature.

A further object is to provide an improved thermostatically operable means to shut off the heater when a predetermined maximum temperature is exceeded.

A further object is to provide a shut off device of the above mentioned type which is simple in construction, dependable in operation, and which may be economically manufactured.

Other objects will appear from the following description, reference being had to the accompanying drawings, in which Figure 1 is a fragmentary sectional view of an automobile heater of the internal combustion type, showing the improved valve closing device;

Figure 2 is a fragmentary transverse sectional view taken on the line 2—2 of Figure 1;

Figure 3 is a fragmentary sectional view of a modified form of my invention; and Figure 4 is a view similar to Figure 3, illustrating a further modification.

In automobile heaters of the internal combustion type, such as are more fully described in my copending applications, Serial No. 61,213, filed January 28, 1936, and Serial No. 120,524, filed January 14, 1937, it is desirable to provide some means for causing discontinuance of the operation of the heater whenever the temperature of the radiator becomes excessively high. While such condition does not occur frequently, it may happen that the motor for driving the fan which circulates the air from the passenger compartment of the vehicle past the radiator, may become inoperative, and as a result the radiator may become excessively hot and cause damage to parts of the heater or to parts of the automobile in which it is mounted, or to contents of the automobile. To prevent such damage, heaters in the past have been provided with a thermostatically operable vent valve which opened upon a predetermined maximum temperature and admitted atmospheric air to the combustion chamber of the heater, thereby rendering the mixture so lean as not to be combustible and thus causing extinguishment of the flame.

In accordance with my present invention the same purpose is accomplished in a more simple, convenient, reliable, and economical manner.

Referring to Figure 1, the heater comprises, generally, a fuel and air mixing device 10 which is supplied with liquid fuel such as gasoline through a conduit 12 and feeds a mixture of the fuel and air into a combustion chamber 14 where the combustible mixture is ignited by an igniter 16 which is preferably of the electrically heated resistance wire type. Combustion is maintained by a re-igniter plug 18 having a passageway 20 through which the products of combustion flow into one end of a circuitous passageway 22 formed in a radiator casting 24. The outlet of the passageway 22 is formed by a vacuum compensator 26 having venturi shaped passageway 28 extending therethrough, the mouth 30 of said passageway forming a seat for a control valve 32. The products of combustion are drawn through the passageway 28 and a conduit 34 into the intake manifold 36 of the internal combustion engine of the automobile, or to any other suitable space at sub-atmospheric pressure.

The radiator casting 24 is surrounded by a shell 38 which has fins 40 pressed thereover, and air from the passenger compartment of the vehicle is forced downwardly past the radiator by a fan 42 driven by an electric motor 44. The supply of electrical energy to the motor 44 and to the igniter 16 is controlled by a switch mechanism designated generally by the reference character 46, so as to cause energization of the igniter 16 and the motor 44 in proper sequence. This switch mechanism is more fully disclosed and claimed in my copending application, Serial No. 120,523, filed January 14, 1937. The operation of this switch mechanism is initially controlled by pulling outwardly a button or handle 48 from the position in which it is shown in dotted lines in Figure 1 to the position in which it is shown in full lines in said figure.

Rigidly attached to the control button 48 is a stem 50 for the valve 32. The stem is guided for longitudinal movement in a bushing 52 which is threaded in the radiator casting 24, and by an inwardly projecting shoulder 54 forming part of the radiator casting. The valve stem has three positions of adjustment; namely, shut off position, slow heat position, and full heat position, the stem being held in the position to which it is adjusted by a detent spring 56 which is engageable with any one of three grooves 58 formed in the stem, the detent spring 56 being held against movement in a direction parallel with the stem by suitable slots formed in the bushing 52.

The mechanism above described forms the subject matter of my aforesaid applications, the invention claimed herein relating to the means for automatically closing the valve 32 when the temperature of the radiator becomes excessively high. This means comprises a bimetal thermostatic split ring 60 which at ordinary operating temperatures rests in an annular groove 62 formed in the stem 50. A spring 64 is compressed between the bimetal ring 60 and a pin 66 secured in the stem 50 and having its ends projecting therefrom, to provide an abutment for the end of the spring.

Under normal conditions of operation the bimetal ring 60 will expand slightly but to an extent insufficient to permit its disengagement from the groove 62. When, however, the temperature of the radiator rises to an unsafe value, the bimetal ring 60 will expand radially outwardly a sufficient distance so that it will no longer be retained by the walls of the groove 62, but will be forced to the left (Figure 1) by the spring 64 until it abuts against the inner end face of the bushing 52. The spring 64 thereafter will move the valve stem 50 to the right, to close the valve 32 against its seat 30. The spring 64 is made sufficiently strong that it may readily overcome the holding force of the detent spring 56.

When the valve 32, 30 is closed the heater will, of course, be shut off and gradually drop in temperature. The heater will, however, not commence operation when the normal temperature is attained unless the control knob 48 is again pulled outwardly. Under these conditions the bimetal ring 60 will again snap into the groove 62 and the spring 64 thus again compressed and the device conditioned for operation.

If the condition which resulted in overheating was of a temporary nature, the heater will continue to function in a normal manner. If, however, the condition which caused overheating still continues to prevail, the radiator will again rise to a temperature above the predetermined maximum permitted by the shut off device, and the latter will again operate to cause discontinuance of the operation of the heater. Thus, the operator of the vehicle will be apprized of the fact that there is some abnormal condition present which is causing the heater to tend to operate at an excessive temperature and steps may then be taken to remedy the defect.

It will be apparent that the shut off device is of very simple construction requiring the addition of but three parts (split bimetal ring 60, spring 64, and pin 66) to a heater of otherwise standard construction. It will also be clear that the device will necessarily be very reliable in operation, since the spring 64 may be made sufficiently strong to assure closing of the valve 32 under all conditions. The fact that the device is self-cocking merely upon pulling the control button 48 outwardly renders the device substantially foolproof, since the reconditioning of the device for operation is a necessary incident to causing operation of the heater.

In Figure 3 is shown a modified form of control device in which the handle knob 48 is provided with a stem 70 having a frusto-conical head 72 secured near the inner end thereof. The inner extremity 74 of the stem 70 is guided in a sleeve 76 which is rigidly secured to the valve stem 78. The sleeve 76 is provided with a longitudinally extending slot 80 which, together with a pin 82 which projects through the slot and is secured in the extremity 74 of the stem 70, forms a lost motion connection between the stems 70 and 78. A coil spring 84 is compressed between the ends of the extremity 74 and the end of the stem 78 so as normally to separate the two stems 70 and 78. Such separation is, however, normally prevented by a bimetal thermostatic latch 86 which is secured to the sleeve 76 by any suitable means, illustrated as a pair of rivets 88, which likewise form means for securing the sleeve 76 to the stem 78.

The latch 86 has a hook portion 90 at its free extremity which normally engages behind a shoulder 92 formed by the head 72. Thus when the latch is in this position, the stems 70 and 78 are in effect locked together to move as a single element. When, however, the temperature of the radiator becomes excessively high, through some abnormal condition of operation, the bimetal latch 86 will swing outwardly to permit disengagement of its hook portion 90 from the shoulder 92. The spring 84 will thereupon become effective to move the stem 78 to the right and close the valve 32 against its seat 30, the lost motion between the pin 82 and slot 80 permitting such movement of the stem 78 with respect to the stem 70. In other respects the modified form of the invention shown in Figure 3 will operate in the same manner as the form of the invention shown in Figures 1 and 2.

The modification of the invention shown in Figure 4 operates upon a slightly different principle in that the valve closing device is not automatically re-cocked upon pulling the control knob 48 outwardly. In this construction the stem 94 has a diametrally drilled hole 96 formed therein to receive a pin 98 which is of sufficient length to have its ends projecting beyond the cylindrical surface of the stem 94, thereby to form an abutment for a washer 100 which is pressed against the pin 98 by a compression coil spring 102, the other end of the spring 102 abutting against the projecting ends of a pin 104 which is secured in the stem 94. The pin 98 is made of a metal having a relatively low melting point, such as lead, or a suitable lead or similar alloy, having a melting point approximately that of the maximum normal operating temperature of the heater.

In using the form of the invention shown in Figure 4 the pin 98 will melt when the heater or its radiator attains an excessively high temperature permitting the spring 102 to move the washer 100 to the left (Figure 4) until it abuts against the end face of the bushing 52, whereupon the spring 102 will continue to expand to force the stem 94 and all parts rigid therewith to the right, thus closing the valve 32 against its seat 30. In this construction the shut off device is not automatically reconditioned for operation upon pulling out the control button 48, but it is necessary to disassemble the heater and replace the fusible pin 98. With this latter form of the invention there is assurance that the user of the heater will take the heater to a service station and have corrected the defect which caused overheating.

It will be noted that in the constructions shown in Figures 1 and 4 the control knob 48 is moved inwardly (to the right) whenever the radiator temperature exceeds the predetermined maximum value, and thus the control knob is effective to open the switches included in the switch mechanism 46, since this switch mechanism has a part which extends into the path of movement of the control knob. For this reason these two constructions constitute the preferred forms of my invention, since there is no possibility of causing a continuous drain of electrical energy for supplying the fan motor and the igniter should the operation of the heater be interrupted by the shut off means heretofore described. The construction illustrated in Figure 3 is, however, usable and of advantage in such heaters wherein the position of the control knob does not directly affect the electric switch mechanism. For example, the modification shown in Figure 3 could be used in heaters in which the supply of heating fluid for the radiator is obtained from a remote source and the only control for the operation of the heater itself consists of the valve 32.

From a consideration of the principles underlying the present invention it will be apparent to those skilled in the art that the invention may be applied to a large variety of different forms of automobile heaters and heaters of a similar type.

While I have shown and described particular forms of my invention, it will be apparent to those skilled in the art that it may be embodied in various other forms, all embodying the underlying principle of the invention. I therefore desire to include within the scope of the following claims all such equivalent constructions whereby substantially the results of my invention may be obtained by substantially the same means.

I claim:

1. In an internal combustion heater for automobiles and the like, in combination, a fuel supply line, a combustion chamber; heat exchange means receiving the products of combustion from said combustion chamber; a vacuum producing device for removing the products of combustion and causing said fuel supply line to be under less than atmospheric pressure; an outlet connecting said heat exchange means with said vacuum producing device; a valve in said outlet; manually controlled means for controlling said valve to start and stop the operation of said heater; and temperature responsive means for closing said valve independently of said manually controlled means when the temperature of said heater becomes dangerously high, thereby preventing said heater from operating.

2. In a vacuum operated internal combustion heater for automobiles and the like, having a fuel supply, a combustion chamber receiving and burning fuel from said fuel supply, a heat exchange means for receiving the products of combustion from said combustion chamber, and an outlet for removing the products of combustion from said heat exchange means under vacuum; the combination of a normally manually controlled valve in said outlet for starting and stopping the operation of said heater, a stem attached to said valve, an abutment on said stem, a releasable stop attached to said stem, a helical spring coiled around said stem and normally held in compression between said abutment and said stop; a temperature responsive means for normally holding said stop and releasing it when the temperature in said heater becomes dangerously high; and a fixed abutment for receiving the thrust of said spring when it is released by said temperature responsive means, whereby said stem is moved to close said valve and said heater is prevented from operating.

3. In a vacuum operated internal combustion heater for automobiles and the like, having a fuel supply, a combustion chamber receiving and burning fuel from said fuel supply, a heat exchange means for receiving the products of combustion from said combustion chamber, and an outlet for removing the products of combustion from said heat exchange means under less than atmospheric pressure, the combination of a normally manually controlled valve in said outlet for starting and stopping the operation of said heater, a stem attached to said valve, an abutment on said stem, a fusible stop attached to said stem; a spring associated with said stem and held in compression between said abutment and said stop; said stop being constructed of a material which fuses when the temperature in the heater becomes dangerously high, thereby releasing said spring and allowing it to expand itself; a shoulder for receiving the thrust of said spring when it is released so that said spring moves said stem and actuates said valve, closing it and preventing said heater from operating.

4. In a vacuum operated internal combustion heater for automobiles and the like, having a fuel supply; a combustion chamber receiving and burning fuel from said fuel supply; a heat exchange means for receiving the products of combustion from said combustion chamber; and an outlet for removing the products of combustion from said heat exchange means under less than atmospheric pressure; the combination of a normally manually controlled valve in said outlet for starting and stopping the operation of said heater; a push-pull rod for manually opening and closing said valve, thereby starting and stopping the operation of said heater; an abutment fixed to said rod; a helical spring coiled around said rod and pushing against said abutment; a fusible element attached to said rod and normally holding said spring in compression against said fixed abutment, said fusible plug being constructed of a material which will fuse when the temperature in said heater becomes dangerously high; and a fixed shoulder for receiving the thrust of said spring when it is released, thereby causing said spring to move said rod and actuate said valve to its closed position, preventing the heater from operating.

5. In an internal combustion heater for automobiles and the like, in combination, a fuel supply line, a combustion chamber, heat exchange means receiving the products of combustion from said combustion chamber, a source of vacuum, an outlet conduit connecting said heat exchange means with said source of vacuum, said conduit serving to remove the products of combustion from said heat exchange means and causing a mixture of air and fuel from said fuel supply line to flow into said combustion chamber, a valve for controlling the flow through said combustion chamber and heat exchange means, a spring urging said valve to closed position, and means responsive to the temperature of the gases of combustion flowing from said heat exchange device normally preventing said spring from operating said valve and being adapted, upon attainment of a dangerously high temperature, to release said spring for closing said valve.

6. In a heater for automobiles and the like, having a radiator, means for causing circulation of a heating fluid through the radiator, a valve for controlling the flow of the heating fluid; and manually operable means for opening said valve, the combination of a shoulder on said manually operable means, resilient means operable to close said valve, and thermostatic bimetal means responsive to the temperature of said radiator normally engaging said shoulder and holding said resilient means from operation and operable when the temperature of said radiator attains a predetermined maximum value to disengage itself from said shoulder and release said resilient means and permit the latter to close said valve.

7. In an automobile heater of the internal combustion type having a combustion chamber, means for supplying a combustible mixture of fuel and air to said chamber, a radiator connected to said combustion chamber to receive the products of combustion therefrom, means for withdrawing the products of combustion from said radiator, a valve to control the flow of the products of combustion from said radiator and manually operable means to open said valve; the combination of resilient means to close said valve, and a temperature responsive split ring of bimetal embracing said manually operable means for restraining said resilient means from operation until said radiator attains a predetermined maximum temperature.

8. In an automobile heater of the internal combustion type having manually operable means for controlling its operation, resilient means for moving said manually operable means to position to cause discontinuance of the operation of the heater, and means responsive to the temperature of a part of the heater normally to hold said resilient means against operation but to permit operation thereof when said part attains a predetermined maximum temperature, said last named means comprising a thermostatic bimetal element normally engaging and moving with said manually operable means but flexing sufficiently at abnormally high heater temperatures to release itself therefrom.

9. In a heater for automobiles and the like, having a radiator, means for causing circulation of heating fluid through said radiator, a valve for controlling the flow of said heating fluid, and manually operable means for controlling said valve, said manually operable means including a stem secured to said valve; the combination of resilient means attached to said stem and operable to close said valve, a groove formed in said stem, and a bimetal ring normally seating in the said groove and holding said resilient means out of operation and adapted upon attainment of a predetermined maximum temperature to expand sufficiently to permit its disengagement from said groove, thereby releasing said resilient means to close said valve.

10. In a heater for automobiles and the like, having a radiator, means for causing circulation of a heating fluid therethrough, a valve for controlling the flow of said heating fluid, and manually operable means for controlling said valve, said manually operable means including a stem and a bushing for guiding said stem; the combination of an annular groove formed in said stem, a fixed abutment on said stem spaced from said groove, a split bimetal ring normally seating in said groove but adapted upon attainment of a predetermined maximum temperature to be disengaged from said groove, and resilient means comprising a spring coiled about said stem and constrained between said abutment and said split ring, whereby when said predetermined temperature is attained said spring will force said ring from said groove and against the end of said bushing to close said valve.

11. In a heater for automobiles and the like, having a radiator, means for causing circulation of a heating fluid therethrough, a valve for controlling the circulation of said heating fluid and manually operable means for controlling said valve; the combination of a shoulder on said manually operable means, resilient means operable to close said valve, and temperature responsive bimetal operated latching means engaging said shoulder and holding said resilient means from operation and operable when the temperature of said radiator attains a predetermined maximum value to disengage itself from said shoulder and release said resilient means to permit the latter to close said valve.

12. In a heater for automobiles and the like, having a radiator, means for causing circulation of a heating fluid therethrough, a valve for controlling the flow of said heating fluid, and manually operable means for controlling said valve, said last named means including a valve stem having a shoulder thereon and yieldable detent means for holding said stem in one of a plurality of positions of adjustment; the combination of resilient means capable of exerting sufficient force upon said stem in a valve closing direction to overcome the holding effect of said yieldable detent means to close said valve and thermostatic bimetal means normally engaging said shoulder and holding said resilient means from operation and operable when the temperature of said radiator attains a predetermined maximum value, to disengage itself from said shoulder thereby releasing said resilient means and permitting the latter to close said valve.

13. In a heater of the internal combustion type in which the operation is controlled by means of a valve, the combination of a handle for operating said valve, a resilient lost motion connection between said handle and said valve, a thermostatic bimetal operated latch for preventing lost motion between said handle and said valve, and resilient means to cause relative movement between said handle and said valve and thereby to actuate said valve to discontinue the operation of said heater when it attains a sufficiently high temperature to cause release of said latch.

14. In an automobile heater having a passageway for the flow of a heating medium and a valve to close said passageway, the combination of resilient means urging said valve to closed position, a handle for operating said valve, and a bimetallic temperature responsive element forming a latch to connect said handle to said valve until the heater attains an abnormally high temperature and thereafter to permit said resilient means to close said valve and thereby prevent the flow of heating medium.

15. In an automobile heater having a passageway through which the heating fluid is drawn, a valve for controlling the flow of the heating fluid through said passageway, and a manually operable element for actuating said valve, the combination of a thermostatic latching means forming an operating connection between said manually operated element and said valve when said element is at the temperature attained during normal operation of the heater, said latching element being constructed and arranged to disrupt the operating connection between said element and said valve when the heater attains a temperature higher than its normal operating temperature.

16. In an automobile heater of the internal combustion type having a conduit for the discharge of products of combustion therefrom, a valve for controlling the flow of products of combustion through said passageway and a handle for operating said valve, an operating connection between said handle and said valve, said operating connection including a temperature responsive bimetal latch which when subjected to an abnormally high temperature will release and cause closure of said valve irrespective of the position of said handle.

17. In an automobile heater of the internal combustion type having a passageway which when open conditions the heater for operation and which when closed prevents operation of the heater, a valve for closing said passageway and a manually operable control element to control said valve, the combination of a spring acting between said element and said valve and operable to move said valve to closed position, and a bimetal temperature responsive latch to prevent closure of said valve by said spring until the heater attains a predetermined high temperature.

18. In an automobile heater of the internal combustion type having a passageway which when open conditions the heater for operation and which when closed prevents operation of the heater, a valve effective to close said passageway, and a manually operated control element for controlling said valve, the combination of a lost motion connection between said control element and said valve, a spring compressed between said valve and said control element and a thermostatic bimetal operated latch responsive to the temperature of the heater and normally preventing lost motion between said control element and said valve, said latch being effective when raised to an abnormally high temperature to release said valve for movement to passageway-closing position by said spring.

HENRY J. DE N. McCOLLUM.